(12) United States Patent
Itaya et al.

(10) Patent No.: US 10,383,134 B2
(45) Date of Patent: *Aug. 13, 2019

(54) INFORMATION PROCESSING DEVICE, INFORMATION PROCESSING METHOD AND PROGRAM

(71) Applicant: SONY CORPORATION, Tokyo (JP)

(72) Inventors: Natsuki Itaya, Tokyo (JP); Kazuyuki Sakoda, Chiba (JP); Nobuhiko Watanabe, Kanagawa (JP); Mitsuru Takehara, Tokyo (JP); Takatoshi Nakamura, Tokyo (JP); Masayuki Takada, Tokyo (JP); Shuhei Sonoda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/995,964

(22) Filed: Jun. 1, 2018

(65) Prior Publication Data

US 2018/0279323 A1 Sep. 27, 2018

Related U.S. Application Data

(63) Continuation of application No. 15/032,750, filed as application No. PCT/JP2014/071572 on Aug. 18, 2014, now Pat. No. 10,015,806.

(30) Foreign Application Priority Data

Nov. 15, 2013 (JP) ................... 2013-236376

(51) Int. Cl.
*H04W 72/04* (2009.01)
*H04W 72/10* (2009.01)
*H04W 84/18* (2009.01)

(52) U.S. Cl.
CPC ....... *H04W 72/10* (2013.01); *H04W 72/0473* (2013.01); *H04W 72/0486* (2013.01); *H04W 84/18* (2013.01)

(58) Field of Classification Search
CPC .................. H04W 72/10; H04W 72/0473
(Continued)

(56) References Cited

U.S. PATENT DOCUMENTS 6,643,256 B1 * 11/2003 Shimojo ............. H04L 12/5601
370/229
10,015,806 B2 * 7/2018 Itaya ..................... H04W 72/10
(Continued)

FOREIGN PATENT DOCUMENTS

JP 2009-523378 A 6/2009
JP 2009-239385 A 10/2009
(Continued)

*Primary Examiner* — Peter G Solinsky
(74) *Attorney, Agent, or Firm* — Xsensus, LLP

(57) ABSTRACT

Communication resources are appropriately used. An information processing device is an information processing device including an acquisition unit and a control unit. Here, the acquisition unit acquires a relative priority of each information processing device in a network built through autonomous wireless communication of a plurality of information processing devices. In addition, the control unit performs control such that a communication resource of the network is allocated based on the priority (a relative priority of each information processing device in the network) acquired by the acquisition unit.

18 Claims, 11 Drawing Sheets

| POINT ASSIGNING ELEMENTS | POINTS |
|---|---|
| INFORMATION AND CONTENT THAT OTHER INFORMATION PROCESSING DEVICES DESIRE TO ACCESS ARE RETAINED | 1 |
| INFORMATION AND CONTENT ARE DISTRIBUTED TO OTHER INFORMATION PROCESSING DEVICES | 1 |
| COMMUNICATION WITH OTHER INFORMATION PROCESSING DEVICES IS RELAYED | 3 |
| COMMUNICATION FROM OTHER INFORMATION PROCESSING DEVICES TO PUBLIC NETWORK IS RELAYED | 3 |
| COMMUNICATION FROM OTHER INFORMATION PROCESSING DEVICES TO PUBLIC NETWORK IS CACHED | 2 |
| PRIORITY DETERMINANT ELEMENT IS INCLUDED | VALUE ACCORDING TO PRIORITY DETERMINANT ELEMENT |
| PURCHASE | VALUE ACCORDING TO PURCHASE |
| METHOD IN WHICH SNS IS USED TO INDUCE CONNECTION TO MESH NETWORK IS PERFORMED | VALUE ACCORDING TO NUMBER OF SNS FOLLOWERS |
| CONNECTION INFORMATION THAT USER POSTED ON SNS HAS BEEN ACCESSED | VALUE ACCORDING TO NUMBER OF ACCESSES |
| THERE IS EXCHANGE OF USERS ABOUT MESH NETWORK ON SNS | VALUE ACCORDING TO NUMBER OF EXCHANGES |

(58) Field of Classification Search
 USPC .......................................................... 370/329
 See application file for complete search history.

(56) References Cited

U.S. PATENT DOCUMENTS

| | | | |
|---|---|---|---|
| 2007/0206554 A1* | 9/2007 | Laroia ................... | H04L 5/0035 370/338 |
| 2013/0044654 A1 | 2/2013 | Chen et al. | |
| 2013/0122811 A1 | 5/2013 | Scribano et al. | |
| 2013/0174277 A1 | 7/2013 | Kiukkonen et al. | |
| 2015/0256323 A1* | 9/2015 | Gandarillas Diego | ... H04L 5/16 370/281 |

FOREIGN PATENT DOCUMENTS

| | | |
|---|---|---|
| JP | 2012/227751 A | 11/2012 |
| WO | 2008/120646 A | 10/2008 |

* cited by examiner

FIG. 3
PRIORITY LIST
300
| IDENTIFICATION INFORMATION (301) | PRIORITIES (302) |
|---|---|
| 1000 | 3 |
| 1001 | 3 |
| 1002 | 2 |
| 1003 | 1 |
| 1004 | 2 |
POINT INFORMATION
310
| IDENTIFICATION INFORMATION (311) | POINTS (312) |
|---|---|
| 1000 | 17 |

FIG. 4

| PRIORITY DETERMINANT ELEMENTS | PRIORITIES |
|---|---|
| FUNCTION OF ACCESSING PUBLIC NETWORK IS INCLUDED | 3 |
| RELAY OF COMMUNICATION WITH OTHER INFORMATION PROCESSING DEVICES IS SET | 3 |
| RELAY OF ACCESS FROM OTHER INFORMATION PROCESSING DEVICES TO PUBLIC NETWORK IS SET | 3 |
| POWER SOURCE IS CONNECTED | 2 |
| INFORMATION AND CONTENT THAT OTHER INFORMATION PROCESSING DEVICES DESIRE TO ACCESS ARE RETAINED | 1 |
| STORAGE CAPACITY OF INFORMATION PROCESSING DEVICE IS GREATER THAN THRESHOLD | 1 |
| MEMORY CAPACITY OF INFORMATION PROCESSING DEVICE IS GREATER THAN THRESHOLD | 1 |
| FUNCTION THAT OTHER INFORMATION PROCESSING DEVICES DESIRE TO USE IS INCLUDED | 1 |
| ALLOCATION OF MEMORY, STORAGE, AND COMMUNICATION BAND FOR COMMUNICATION FROM OTHER INFORMATION PROCESSING DEVICES IS SET | 1 |

| POINT ASSIGNING ELEMENTS | POINTS |
|---|---|
| INFORMATION AND CONTENT THAT OTHER INFORMATION PROCESSING DEVICES DESIRE TO ACCESS ARE RETAINED | 1 |
| INFORMATION AND CONTENT ARE DISTRIBUTED TO OTHER INFORMATION PROCESSING DEVICES | 1 |
| COMMUNICATION WITH OTHER INFORMATION PROCESSING DEVICES IS RELAYED | 3 |
| COMMUNICATION FROM OTHER INFORMATION PROCESSING DEVICES TO PUBLIC NETWORK IS RELAYED | 3 |
| COMMUNICATION FROM OTHER INFORMATION PROCESSING DEVICES TO PUBLIC NETWORK IS CACHED | 2 |
| PRIORITY DETERMINANT ELEMENT IS INCLUDED | VALUE ACCORDING TO PRIORITY DETERMINANT ELEMENT |
| PURCHASE | VALUE ACCORDING TO PURCHASE |
| METHOD IN WHICH SNS IS USED TO INDUCE CONNECTION TO MESH NETWORK IS PERFORMED | VALUE ACCORDING TO NUMBER OF SNS FOLLOWERS |
| CONNECTION INFORMATION THAT USER POSTED ON SNS HAS BEEN ACCESSED | VALUE ACCORDING TO NUMBER OF ACCESSES |
| THERE IS EXCHANGE OF USERS ABOUT MESH NETWORK ON SNS | VALUE ACCORDING TO NUMBER OF EXCHANGES |

INFORMATION PROCESSING DEVICE, INFORMATION PROCESSING METHOD AND PROGRAM

CROSS REFERENCE TO RELATED APPLICATIONS

This application is a Continuation of U.S. patent application Ser. No. 15/032,750, filed Apr. 28, 2016, which is a U.S. National Phase of International Patent Application No. PCT/JP2014/071572 filed on Aug. 18, 2014, which claims priority benefit of Japanese Patent Application No. JP 2013-236376 filed in the Japan Patent Office on Nov. 15, 2013. Each of the above-referenced applications is hereby incorporated herein by reference in its entirety.

TECHNICAL FIELD

The present technology relates to an information processing device, and specifically, to an information processing device configured to exchange various pieces of information using wireless communication, an information processing method thereof and a program causing a computer to execute the method.

BACKGROUND ART

In the related art, wireless communication technologies in which wireless communication is used to exchange various types of data are provided. For example, a communication method (for example, ad hoc communication or an ad hoc network) in which autonomous interconnection is performed with an approaching information processing device is proposed (for example, refer to Patent Literature 1).

CITATION LIST

Patent Literature

Patent Literature 1: JP 2009-239385A

SUMMARY OF NVENTION

Technical Problem

According to the above-described technologies of the related art, it is possible to exchange various types of data between two information processing devices using wireless communication without wired line connection. In addition, in such a network, the information processing devices can communicate with an approaching information processing device without depending on a master station such as a control device. Further, in an ad hoc network, when a new information processing device appears nearby, the new information processing device can also freely participate in the network. Therefore, it is possible to increase coverage of the network according to an increased number of information processing devices nearby.

In addition, each information processing device can transfer information exchanged with other information processing devices in a bucket brigade manner (a so-called multi-hop-relay) in addition to autonomously interconnecting with an approaching information processing device. In addition, a network in which multi-hop is performed is generally known as a mesh network.

In this manner, in the ad hoc network or the mesh network, it is possible to freely communicate with a nearby information processing device. In addition, by connecting with the nearby information processing device, the network can be extended. In this manner, when the network is extended, data is exchanged among a plurality of information processing device, the network can be extended. In this manner, when the network is extended, data is exchanged among a plurality of information processing devices. Therefore, it is important to appropriately use communication resources.

The present technology has been made in view of the above-described problems and is provided to appropriately use communication resources.

Solution to Problem

The present technology is achieved to solve the technical problem, and a first aspect thereof provides an information processing device, an information processing method thereof, and a program causing a computer to execute the information processing method, the information processing device including: an acquisition unit configured to acquire a relative priority of each information processing device in a network built through autonomous wireless communication of a plurality of information processing devices; and a control unit configured to perform control such that a communication resource of the network is allocated based on the priority. Accordingly, there is provided an operation in which communication resources of the network are allocated based on the relative priority of each information processing device in the network.

According to the first aspect, the control unit may perform control such that the communication resource is allocated based on a comparison result of the priority of another information processing device belonging to the network and a priority of the information processing device. Accordingly, there is provided an operation in which communication resources of the network are allocated based on a comparison result of a priority of another information processing device belonging to the network and a priority of a subject device.

According to the first aspect, the control unit may perform control such that a magnitude of transmission power is allocated as the communication resource. Accordingly, there is provided an operation in which a magnitude of transmission power is allocated based on a relative priority of each information processing device in the network.

According to the first aspect, the control unit may perform control such that a channel is allocated as the communication resource. Accordingly, there is provided an operation in which a channel is allocated based on a relative priority of each information processing device in the network.

According to the first aspect, the control unit may perform control such that a channel whose congestion level is lower than a threshold serving as a reference is allocated to an information processing device whose relative priority is high, and a channel whose congestion level is greater than a threshold serving as a reference is allocated to an information processing device whose relative priority is low. Accordingly, there is provided an operation in which a channel whose congestion level is lower than a threshold serving as a reference is allocated to an information processing device whose relative priority is high, and a channel whose congestion level is greater than a threshold serving as a reference is allocated to an information processing device whose relative priority is low.

According to the first aspect, the control unit may perform control such that a transmission timing is allocated as the communication resource. Accordingly, there is provided an operation in which a transmission timing is allocated based on a relative priority of each information processing device in the network.

According to the first aspect, the acquisition unit may acquire the relative priority from list information in which a priority of an information processing device belonging to the network is retained for each information processing device. Accordingly, there is provided an operation in which priorities are acquired from list information.

According to the first aspect, the list information may separately retain a first priority for transmitting data to another information processing device belonging to the network and a second priority for receiving data from another information processing device belonging to the network. The control unit may perform control such that, when data is transmitted using the communication resource, the communication resource is allocated based on the first priority, and when data is received using the communication resource, the communication resource is allocated based on the second priority. Accordingly, there is provided an operation in which communication resources of the network are allocated based on the first priority when data is transmitted, and communication resources of the network are allocated based on the second priority of the network when data is received.

According to the first aspect, the control unit may perform control such that a priority of the information processing device is changed based on point information about the information processing device. Accordingly, there is provided an operation in which a priority of the subject device is changed based on the point information.

According to the first aspect, the control unit may perform control such that the priority of the information processing device is set to be high using the point information. Accordingly, there is provided an operation in which a priority of the subject device is set to be high using the point information.

According to the first aspect, the control unit may perform control such that the point information is exchanged with another information processing device belonging to a network other than the network. Accordingly, there is provided an operation in which the point information is exchanged with other information processing devices belonging to a network other than the network to which the subject device belongs.

According to the first aspect, the control unit may perform control such that the point information is added based on a user activity in a social networking service (SNS). Accordingly, there is provided an operation in which the point information is added based on a user activity in the SNS.

According to the first aspect, the control unit may perform control such that setting information for performing connection to the network is distributed through an SNS. Accordingly, there is provided an operation in which setting information for performing connection to the network to which the subject device belongs is distributed through the SNS.

According to the first aspect, the control unit may perform control such that priority information for notifying another information processing device of a priority of the information processing device is included in a beacon and transmitted. Accordingly, there is provided an operation in which priority information for notifying another information processing device of a priority of the subject device is included in a beacon and transmitted.

Advantageous Effects of Invention

According to an embodiment of the present technology, an excellent effect in which communication resources can be appropriately used can be obtained. Note that effects described herein are not necessarily limited, and any effect described in the present disclosure may be achieved.

BRIEF DESCRIPTION OF DRAWINGS

FIG. 3 is a diagram illustrating one example of a priority list and point information that the information processing device 100 in the first embodiment of the present technology retains.

FIG. 4 is a diagram illustrating a relation between priority determinant elements 321 and priorities 322 used when priorities of information processing devices of the communication system 10 in the first embodiment of the present technology are determined.

FIG. 5 is a diagram illustrating a relation between point assigning elements 331 and points 332 used when points of information processing devices of the communication system 10 in the first embodiment of the present technology are calculated.

DESCRIPTION OF EMBODIMENTS

Hereinafter, a form (hereinafter referred to as an "embodiment") for implementing the present technology will be described. The description will proceed in the following order.

1. First embodiment (an example in which communication resources of a network are allocated based on relative priorities of information processing devices belonging to the network)

2. Application Example

<1. First Embodiment>

[Configuration Example of Communication System]

Figure 1:
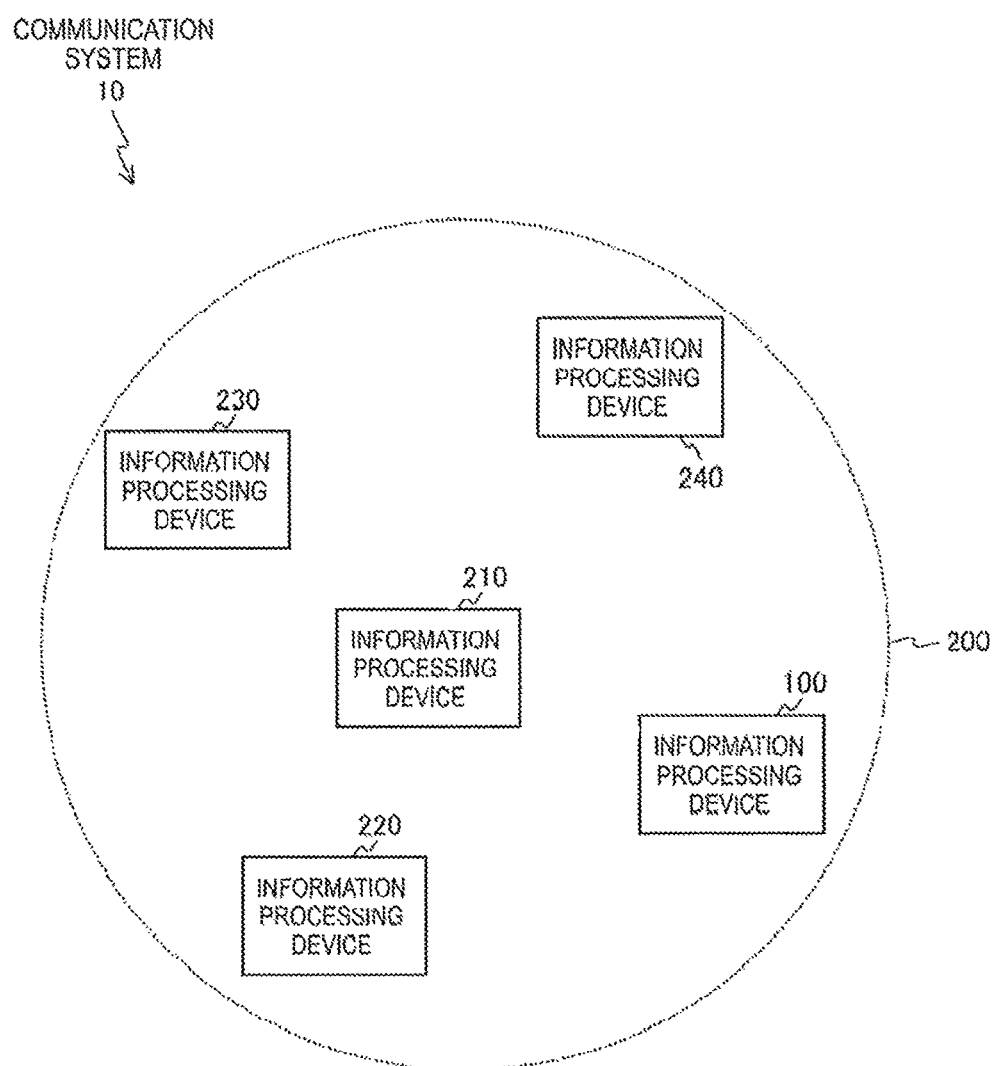
FIG. 1 is a diagram illustrating an exemplary system configuration of a communication system 10 in a first embodiment of the present technology.

FIG. 1 is a diagram illustrating a system configuration example of a communication system 10 in the first embodiment of the present technology.

The communication system 10 includes a plurality of information processing devices (information processing devices 100, 210, 220, 230, and 240). The information processing devices of the communication system 10 are, for example, portable information processing devices or fixed-type information processing devices having a wireless communication function. Note that, the portable information processing device is an information processing device, for example, a smartphone, a mobile phone, a tablet terminal, a game device, a reproducing device (reproducing an image or reproducing music), or an image capturing device. In addition, the fixed-type information processing device is an information processing device (for example, an information processing device that is connected to a power source when used), for example, a printer, a personal computer, a television, and various consumer electronics.

For example, the information processing devices 100, 210, 220, 230, and 240 belong to the same network in L2 (a second layer), and the information processing devices can communicate with each other in L3 (a third layer) or higher as necessary. For example, in a mesh network in which Institute of Electrical and Electronics Engineers (IEEE) 802.11S is used, the same service set identifier (SSID) and passphrase are used. In addition, when an L3 network mechanism such as Internet Protocol (IP) is used, the devices can communicate with each other in any place in the network.

In addition, the information processing devices belonging to the same network can connect from anywhere as long as the information processing device is in a range that radio waves reach. For example, in the mesh network in which IEEE 802.11S is used, when the information processing device belonging to the same network is in the range that radio waves reach, since the information processing device can connect, it is possible to obtain connectivity for an entire network.

Here, as a communication method in which autonomous interconnection is performed with an approaching information processing device, ad hoc communication, an ad hoc network, and a mesh network are known. In such a network, the information processing devices can communicate with an approaching information processing device without depending on a master station (for example, a control device).

For example, by a communication method such as Wireless Fidelity (Wi-Fi, registered trademark) or Bluetooth (registered trademark), autonomous interconnection can be performed with the approaching information processing device.

For example, the mesh network in which IEEE 802.11S is used has a characteristic in which a relation between devices is equal. That is, the mesh network in which IEEE 802.11 S is used can build a mesh network having no master-slave relation such as Wi-Fi. In addition, the mesh network in which IEEE 802.11S is used has a characteristic in which path selection can be automatically switched. That is, in the mesh network in which IEEE 802.11S is used, when any link is disconnected, switching to a route in which the other link is used can be automatically performed. In addition, the mesh network in which IEEE 802.11 S is used has a characteristic in which transmission power can be controlled. That is, in the mesh network in which IEEE 802.11 S is used, by controlling transmission power of each of the information processing devices, it is possible to change a distance reached and a communication speed. In addition, the mesh network in which IEEE 802.11 S is used has a characteristic in which it is possible to perform time synchronization between the information processing devices. For example, in the mesh network in which IEEE 802.11 S is used, it is possible to implement millisecond-order time synchronization.

Therefore, in the embodiment of the present technology, as a communication method in which autonomous interconnection is performed with an approaching information processing device, the mesh network in which IEEE 802.11S is used (the ad hoc network) will be exemplified.

For example, in the ad hoc network, when a new information processing device is added nearby, the new information processing device can also freely participate in the network. For example, initially, among information processing devices illustrated in FIG. 1, only the information processing device 100, the information processing device 210, and the information processing device 220 are assumed to participate in the ad hoc network. In this case, the information processing device 230 and the information processing device 240 are assumed to be sequentially added. In this case, it is possible to increase coverage of the network according to an increased number of such information processing devices (approaching information processing devices). That is, it is possible to increase coverage of the network according to sequential addition of the information processing device 230, and the information processing device 240.

Here, the information processing devices can transfer information exchanged with other information processing devices in a bucket brigade manner in addition to autonomously interconnecting with the approaching information processing device.

For example, it is assumed that the information processing device 100 can directly communicate with the information processing devices 210, 220, and 240 but are unable to directly communicate with the information processing device 230 due to radio waves not reaching.

Even when direct communication may be impossible in this manner, the information processing devices (the information processing devices 210, 220, and 240) that can directly communicate with the information processing device 100 can transfer data of the information processing device 100 to the information processing device 230. Therefore, by transferring data in this manner, the information processing device 100 and the information processing device 230 that are unable to directly communicate with the information processing device 100 can exchange information through any of the information processing devices 210, 220, and 240.

A method in which data transfer (so-called bucket brigade) is performed with one other in this manner, and information is delivered to a remote information processing device is called a multi-hop-relay. In addition, a network in which multi-hop is performed is generally known as a mesh network.

Note that, in FIG. 1, a network 200 such as an ad hoc network or a mesh network is schematically illustrated as a circle with a dotted line. In addition, FIG. 2 illustrates a configuration of an information processing device belonging to the network 200.

[Functional Configuration Example of Information Processing Device]

Figure 2:
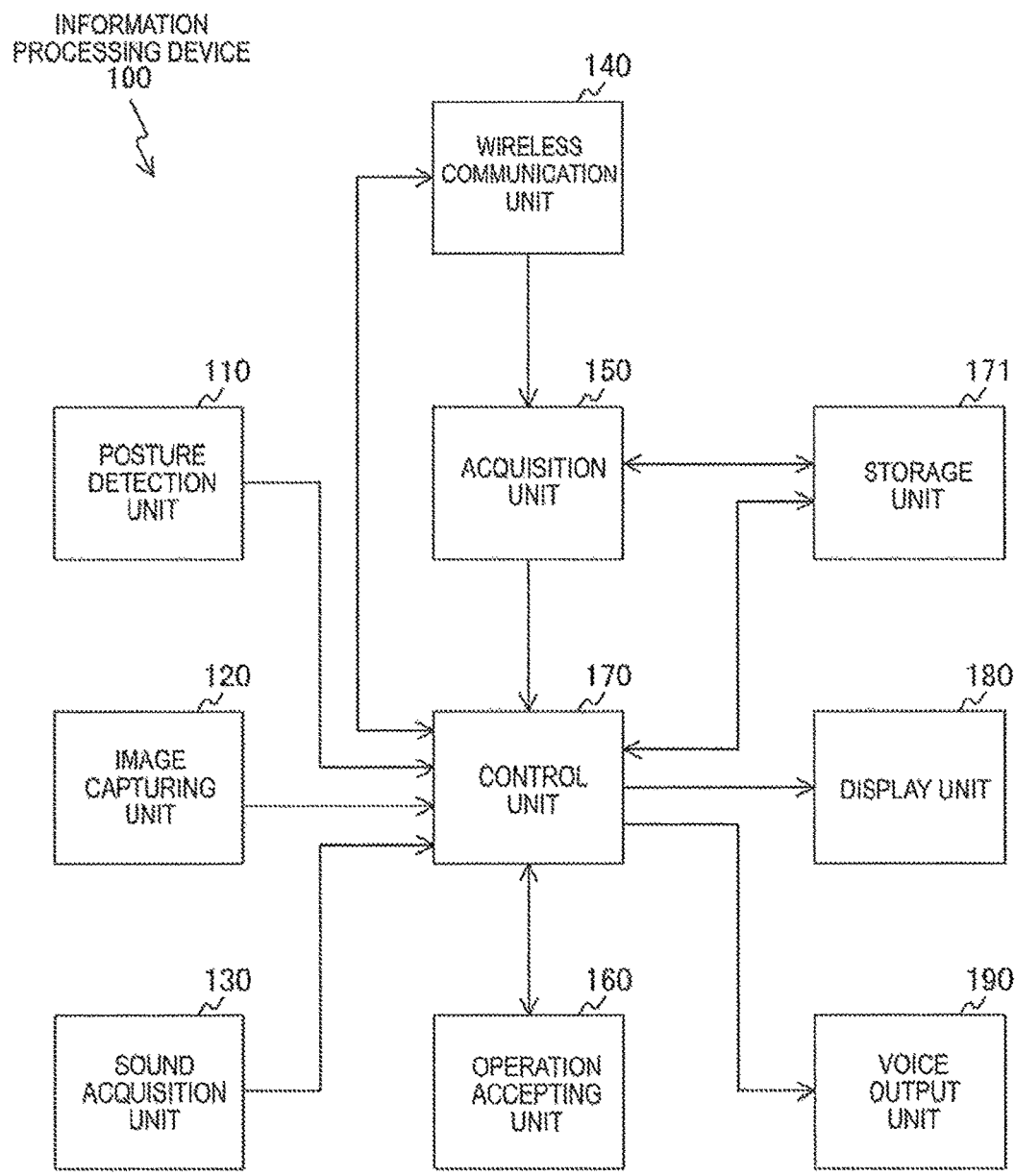
FIG. 2 is a block diagram illustrating an exemplary function and configuration of an information processing device 100 in the first embodiment of the present technology.

FIG. 2 is a block diagram illustrating a functional configuration example of the information processing device 100 in the first embodiment of the present technology.

The information processing device 100 includes a posture detection unit 110, an image capturing unit 120, a sound acquisition unit 130, a wireless communication unit 140, an acquisition unit 150, an operation accepting unit 160, a control unit 170, a storage unit 171, a display unit 180, and a voice output unit 190.

The posture detection unit 110 detects a change (including movement of the information processing device 100) of a posture of the information processing device 100 by detecting an acceleration, a motion, and a tilt of the information processing device 100, and outputs change information about the detected posture change to the control unit 170. Note that, as the posture detection unit 110, for example, an acceleration sensor, a geomagnetic sensor, a gyro sensor, or a global positioning system (GPS) can be used. For example, the posture detection unit 110 uses position information (for example, a latitude and a longitude) detected using GPS and can obtain a moving distance (for example, a moving distance per unit time) and a moving direction of the information processing device 100. In addition, for example, the posture detection unit 110 can obtain a moving distance and a moving direction using an acceleration sensor. In addition, for example, the posture detection unit 110 can obtain an orientation using a geomagnetic sensor.

The image capturing unit 120 generates an image (image data) by capturing a subject and outputs the generated image to the control unit 170. The image capturing unit 120 includes, for example, an optical system (a plurality of lenses), an image capturing element, and a signal processing unit.

The sound acquisition unit 130 acquires sound near the information processing device 100, and outputs the acquired sound data (sound) to the control unit 170. Also, the sound acquisition unit 130 is implemented by, for example, a microphone.

The wireless communication unit 140 transmits and receives information to and from with other information processing devices (for example, the information processing devices 210, 220, and 230) using wireless communication based on control of the control unit 170. As described above, the embodiment of the present technology exemplifies a case in which the wireless communication unit 140 performs communication using IEEE 802.11 S protocol.

However, the wireless communication unit 140 may perform wireless communication according to other wireless communication specifications. For example, a wireless local area network (LAN) can be used. As the wireless LAN, for example, Wi-Fi (for example, IEEE 802.11 n) can be used. In addition, as the wireless communication, wireless communication such as near field communication (NFC), Bluetooth (registered trademark), visible light communication, infrared communication and portable radio wave communication can be used. In addition, as the wireless communication, for example, millimeter wave communication (such as 60 GHz), 900 MHz/2.4 GHz/5 GHz wireless LAN, or ultra wide band (UWB) can be used.

Note that, the wireless communication unit 140 may perform wireless communication using radio waves (electromagnetic waves), or perform wireless communication (for example, wireless communication that is performed using a magnetic field) using a medium other than radio waves. In addition, the wireless communication unit 140 may include a connection function to a public network such as 3rd Generation (3G) or Wi-Fi service areas.

For example, the wireless communication unit 140 exchanges a signal for generating or updating a multi-hop communication route using wireless communication with other information processing devices based on control of the control unit 170.

The acquisition unit 150 acquires relative priorities of information processing devices in the network 200 built through autonomous wireless communication of a plurality of information processing devices based on information from the wireless communication unit 140. Therefore, the acquisition unit 150 retains the acquired priority in a priority list 300 (illustrated in FIG. 3a) for each information processing device. In addition, the acquisition unit 150 acquires the priorities retained in the priority list 300 and supplies the acquired priorities to the control unit 170.

The operation accepting unit 160 is an operation accepting unit configured to accept an operation input performed by a user, and outputs operation information corresponding to the content of the accepted operation input to the control unit 170. The operation accepting unit 160 is implemented by, for example, a touch panel, a keyboard, and a mouse.

The control unit 170 controls units of the information processing device 100 based on a control program stored in the storage unit 171. For example, the control unit 170 performs signal processing on transmitted and received information. In addition, the control unit 170 is implemented by, for example, a central processing unit (CPU).

In addition, for example, the control unit 170 performs control such that communication resources of the network 200 are allocated based on the priorities acquired by the acquisition unit 150. Specifically, the control unit 170 performs control such that communication resources of the network 200 are allocated based on a comparison result of a priority of another information processing device belonging to the network 200 and a priority of the information processing device 100.

For example, the control unit 170 performs control such that a magnitude of transmission power is allocated as communication resources of the network 200. This example will be described in detail with reference to FIG. 8. In addition, for example, the control unit 170 performs control such that a channel is allocated as communication resources of the network 200. This example will be described in detail with reference to FIG. 9. In addition, for example, the control unit 170 performs control such that a transmission timing is allocated as communication resources of the network 200. This example will be described in detail with reference to FIG. 10.

The storage unit 171 is a memory configured to store various pieces of information. For example, various pieces of information (for example, a control program) necessary for the information processing device 100 to perform a desired operation are stored in the storage unit 171. In addition, for example, the priority list 300 illustrated in FIG. 3a and point information 310 illustrated in FIG. 3b are stored in the storage unit 171. In addition, for example, a terminal list 300 illustrated in FIG. 3 is stored in the storage unit 171. In addition, images (image data) generated by the image capturing unit 120 or sound (voice data) acquired by the sound acquisition unit 130 are stored in the storage unit 171.

For example, when data is transmitted using wireless communication, the control unit 170 processes information read from the storage unit 171 and generates a data block (a transmission packet) to be actually transmitted. Next, the control unit 170 outputs the generated transmission packet to the wireless communication unit 140. In addition, the wireless communication unit 140 converts the transmission packet into a format of a communication scheme for actual transmission, and then transmits the converted transmission packet from an antenna (not illustrated) to the outside.

In addition, for example, when wireless communication is used to receive data, the wireless communication unit 140 extracts a reception packet through signal processing performed on a radio wave signal received through the antenna (not illustrated) by a receiver in the wireless communication unit 140. Therefore, the control unit 170 interprets the extracted reception packet. When it is determined that data should be retained based on the interpretation result, the control unit 170 writes the data in the storage unit 171. In addition, when it is determined that data should be transferred to other information processing devices, the control unit 170 outputs the data to the wireless communication unit 140 as a transmission packet to be transferred to the other information processing devices.

The display unit 180 is a display unit configured to display various pieces of information based on control of the control unit 170. Note that, as the display unit 180, for example, a display panel such as an organic electro luminescence (EL) panel and a liquid crystal display (LCD) panel can be used. Note that, the operation accepting unit 160 and the display unit 180 can be integrally formed using a touch panel through which the user can perform an operation input by contacting or approaching a display surface with a finger.

The voice output unit 190 is a voice output unit configured to output various voices based on control of the control unit 170. Note that, the voice output unit 190 is implemented by, for example, a speaker.

In this manner, the information processing device 100 can record an image generated by capturing a subject in the storage unit 171, record the acquired voice in the storage unit 171, and reproduce information (for example, image data and voice data) recorded in the storage unit 171.

Note that, since a functional configuration of other information processing devices (the information processing devices 210, 220, 230, and 240) is substantially the same as that of the information processing device 100, description thereof will be omitted herein. However, components such as the image capturing unit 120, the storage unit 171, the display unit 180, and the voice output unit 190 may differ in each information processing device according to a service available on the built network.

[Management Example of Priority Information and Point Information]

FIG. 3 is a diagram illustrating one example of a priority list and point information that the information processing device 100 in the first embodiment of the present technology retains. FIG. 3a schematically illustrates the priority list 300 that the information processing device 100 retains. FIG. 3a schematically illustrates the point information 310 that the information processing device 100 retains. Note that the priority list 300 and the point information 310 are stored in, for example, the storage unit 171.

The priority list 300 is a list for managing priorities of information processing devices belonging to the same network for the respective information processing devices. That is, priorities (priority information) of all or some information processing devices belonging to the same network are stored in the priority list 300. In addition, for example, identification information 301 and priorities 302 are stored in association in the priority list 300.

The identification information 301 is identification information (terminal identification information) for identifying other information processing devices belonging to the network. As the identification information, for example, a media access control (MAC) address can be used. In addition, for example, application-specific identification information may be used.

Note that, in FIG. 3, for simplicity of description, as identification information, only numbers 1000, 1001, 1002, 1003, and 1004 are shown. For example, the number "1000" in the identification information 301 refers to identification information for identifying the information processing device 100. For example, the number "1001" in the identification information 301 refers to identification information for identifying the information processing device 210. The number "1002" in the identification information 301 refers to identification information for dentifying the information processing device 220. Similarly, the number "1003" in the identification information 301 refers to identification information for identifying the information processing device 230. The number "1004" in the identification information 301 refers to identification information for identifying the information processing device 240.

The priorities 302 are priorities of information processing devices belonging to the network. Also, a priority determining method will be described in detail with reference to FIG. 4.

For example, the acquisition unit 150 regularly or irregularly acquires information (for example, the MAC address and the priorities) about other information processing devices communicating through the wireless communication unit 140, and updates content of the priority list 300 using the acquired information.

For example, the acquisition unit 150 can store priorities of all information processing devices belonging to the same network in the priority list 300. In addition, for example, the acquisition unit 150 may store priorities of sonic information processing devices among information processing devices belonging to the same network in the priority list 300. Note that some information processing devices stored in the priority list 300 can be, for example, at least one of an information processing device that can directly communicate with the information processing device 100 and an information processing device that can perform communication through other information processing devices.

Also, while FIG. 3 illustrates an example in which the identification information 301 and the priorities 302 are stored in association in the priority list 300, other information may be stored in association. For example, information (point information) about the information processing device may be stored in association with the information processing device.

The point information 310 is used to manage information about points (points that the user of the information processing device 100 retains) of the information processing device 100. For example, as the point information 310, identification information 311 and points 312 are stored in association. Note that the identification information 311 corresponds to the identification information 301 illustrated in FIG. 3a.

The points 312 are points of the information processing device 100. Here, the points refer to information (for example, a score or a numerical value) used to assign something to a user who possesses the information processing device 100 (for example, tangible or intangible benefits such as services or incentives). In addition, "points" are used to refer to a point service. Note that "point service" is used to refer to a loyalty program. Note that a point use method and a point calculating method will be described in detail with reference to FIG. 5.

For example, the acquisition unit 150 can store points of the information processing device 100 in the point information 310 based on control of the control unit 170. In addition, the control unit 170 can perform control such that a priority of the information processing device 100 is changed based on point information about the information processing device 100.

[Determination Example of Priority]

FIG. 4 is a diagram illustrating a relation between a priority determinant elements 321 and priorities 322 used when priorities of information processing devices of the communication system 10 in the first embodiment of the present technology are determined.

The priority determinant elements 321 are elements used when priorities of information processing devices of the communication system 10 are determined. For example, a characteristic or setting content of information processing devices can be used as an element.

The priorities 322 are priorities corresponding to the priority determinant elements 321. Note that, in the embodiment of the present technology, priorities are denoted as 1 to 3, priority 3 being the highest priority and priority 1 being the lowest priority. Also, the priorities of the information processing devices can be understood as, for example, levels of importance of the information processing devices.

Such priorities are determined by the control unit 170 regularly (for example, every hour) or irregularly (for example, at a timing at which the power source is turned on). Therefore, the acquisition unit 150 updates content of the priority list 300 whenever the priorities are determined by the control unit 170.

For example, when the information processing device 100 has a function of accessing a public network, the highest priority 3 is determined. In addition, when the information processing device 100 is connected to the power source, the next highest priority 2 is determined. Note that, when the information processing device 100 includes a plurality of priority determinant elements 321, a plurality of different priorities are determined. In this case, a higher priority can be set as the final priority. For example, when priority 3 and priority 2 are determined by the priority determinant elements 321, the higher priority 3 is determined. In addition, when the plurality of different priorities are determined, the final priority may be determined by calculation (for example, an average value of priorities) using priorities. For example, when priority 1, priority 2 and priority 3 are determined by the priority determinant elements 321, priority 2 that is an average thereof is determined.

Note that FIG. 4 illustrates an example in which one priority is determined based on one priority determinant element. However, when a plurality of elements within the priority determinant elements 321 are included, the priority may be determined based on the plurality of elements. In addition, a higher priority (for example, priorities 4 and 5) may be determined based on the plurality of elements.

[Addition Example of Points]

FIG. 5 is a diagram illustrating a relation between point assigning elements 331 and points 332 used when points of information processing devices of the communication system 10 in the first embodiment of the present technology are calculated.

The point assigning elements 331 are elements used when points of information processing devices of the communication system 10 are calculated. For example, information content or communication setting content that information processing devices retain can be used as an element.

The points 332 refer to a value corresponding to the point assigning element 331, and this value is sequentially added.

Such points are determined by the control unit 170 regularly (for example, every hour) or irregularly (for example, at a timing at which the power source is turned on). Therefore, the acquisition unit 150 updates content of the point information 310 whenever the points are determined by the control unit 170. For example, the acquisition unit 150 adds the value of the points determined by the control unit 170 to the value of the point information 310.

Here, in the point assigning elements 331, the points 332 may be set as fixed values (for example, 1 to 3) or set as variable values according to the elements.

For example, in the field "a priority determinant element is included" in the point assigning elements 331, a variable value according to the element may be set. For example, when an element of the priority determinant elements 321 illustrated in FIG. 4 is included, a value according to the element can be set as the points 332. For example, priority 3 is set as 3 points, priority 2 is set as 2 points, and priority 1 is set as 1 point. In this case, for example, when the information processing device 100 has a function of accessing a public network and is connected to the power source, the points are determined as a total value of 5 of priority 3 and priority 2 (that is, 5 points).

In addition, for example, in the field "purchase" in the point assigning elements 331, a variable value according to the element can be set. For example, a value of points that the user purchases can be set as the points 332. The value of the purchased points can be added to, for example, a value of the point information 310 by a user operation.

In addition, for example, a case in which a social networking service (SNS) is used can also be set as the point assigning element.

For example, in the field "a method in which the SNS is used to induce connection to a mesh network is performed" in the point assigning elements 331, a variable value according to the number of SNS followers can be set. In this case, for example, a relation between the number of followers and points (a variable value) is defined in advance and the points are determined based on the definition.

In addition, for example, in the field "connection information that a user posted on the SNS has been accessed" in the point assigning elements 331, a variable value according to the number of accesses can be set. In this case, for example, a relation between the number of accesses and points (a variable value) is defined in advance, and the points are determined based on the definition.

In addition, for example, in the field "there is an exchange of users about a mesh network on the SNS" in the point assigning elements 331, a variable value according to the number of exchanges can be set. In this case, for example, a relation between the number of exchanges and points (a variable value) is defined in advance, and the points are determined based on the definition.

In this manner, point information may be added based on a user activity in the SNS. That is, the control unit 170 can perform control such that point information is added based on a user activity in the SNS.

Note that the number of SNS followers, the number of accesses, and the number of exchanges described above may be automatically acquired by an application, and manually acquired by a user.

[Use Example of Points]

Here, a use example of the points (the points 312 retained in the point information 310) assigned as described above will be described.

For example, the points 312 retained in the point information 310 can be used when a priority of the information processing device 100 is determined. For example, priority 3 is determined for an information processing device having points equal to or greater than a threshold th1, and priority 2 is determined for an information processing device having points equal to or greater than a threshold th2 (where, th>th2).

In addition, a communication priority of a subject device is determined for each type of content that the information processing device 100 communicates, and the points may be spent whenever a high priority is used.

For example, even when the priority 302 of the subject device retained in the priority list 300 is low, it is possible to obtain allocation of communication resources corresponding to the highest priority using predetermined points (for example, 5 points). In this case, for example, reception of allocation of communication resources corresponding to the highest priority is set, and whenever communication is performed with a high priority, points corresponding to the use are subtracted. That is, the control unit 170 can perform control such that a priority of the information processing device 100 can be set to be high using the points 312 retained in the point information 310. Also, even when reception of allocation of communication resources corresponding to the highest priority is set, if another information processing device having a high priority is present and reception of allocation of the communication resources is not possible, subtraction of the points is not performed.

In addition, the points may be transferred from an information processing device to another information processing device. In addition, the points may be transferred between different networks. That is, the control unit 170 can perform control such that point information is exchanged with other information processing devices belonging to a network other than the network to which the information processing device 100 belongs. In this case, point information may be exchanged using wireless communication, or point information may be exchanged by a manual operation of the user. For example, when the information processing device 100 transfers 5 points to another information processing device belonging to the other network, 5 points are subtracted from the points (the points 312 retained in the point information 310) of the information processing device 100.

In addition, when the points are assigned, the points may be managed by management limited to the network, or managed by a device (for example, a server on a public network) outside the network.

In addition, when the points are purchased, purchase management may be limited to the network, or management may be performed by another device (for example, a server on a public network) outside the network. In addition, when a cost paid for purchasing the points is reduced for information processing devices building the network, the cost may be reduced as points or reduced as money.

In addition, the assigned points may be used for a purpose other than the purpose of obtaining a priority for using communication resources in the network.

For example, assigned points in a specific network can be used as a price for using a service that uses the network. In addition, the assigned points in the specific network can be used to enter to win a gift from a company performing a promotion using the network. In addition, for example, the assigned points can be used for a ranking of a user who has many points.

Figure 6:
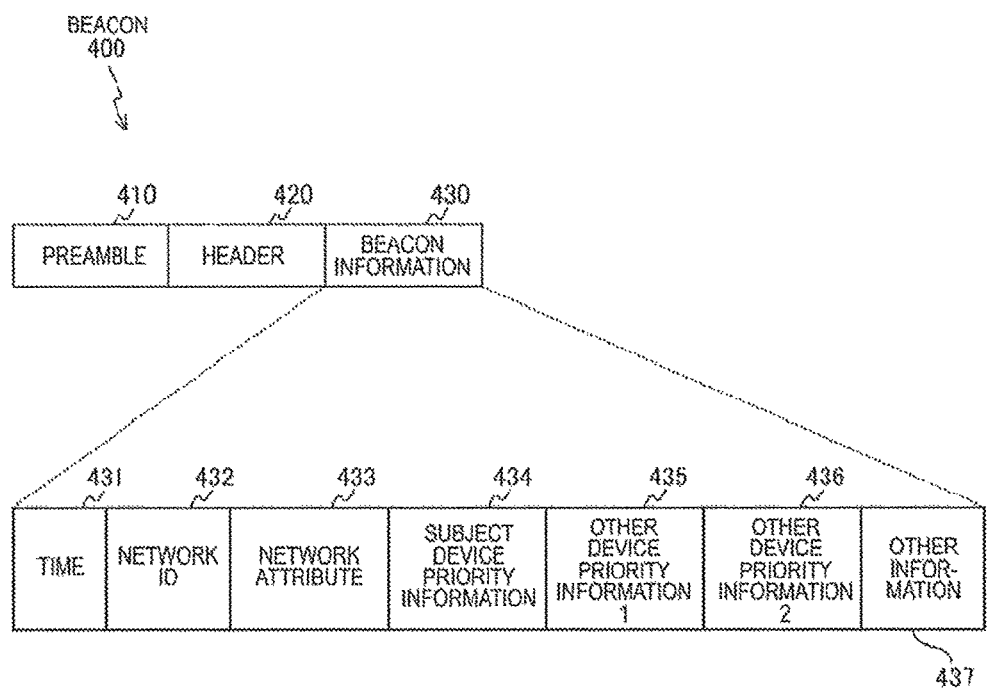
FIG. 6 is a diagram illustrating a format example of a beacon (a beacon frame) that is transmitted from information processing devices of the communication system 10 in the first embodiment of the present technology.
Figure 7:
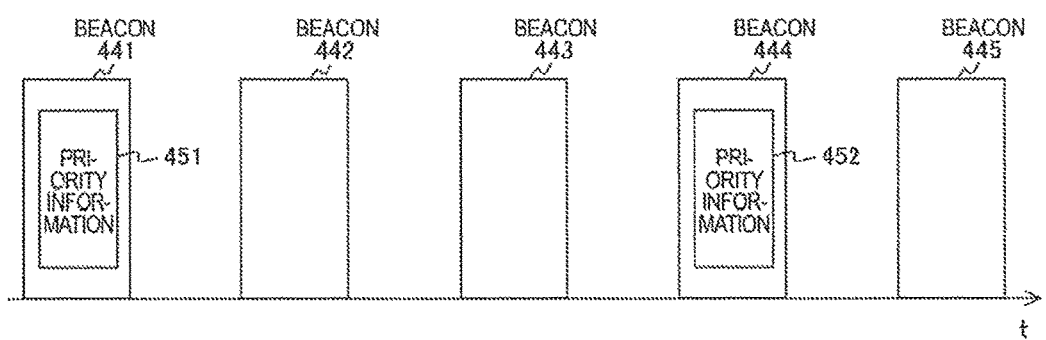
FIG. 7 is a diagram illustrating a transmission example when information processing devices of the communication system 10 in the first embodiment of the present technology transmit priority information.

Here, as a method in which other information processing devices are notified of a priority of the subject device, it is possible to use a frame such as a beacon for notifying another information processing device of the presence of an information processing device belonging to the network. For example, in a network in which IEEE 802.11 S is used, a beacon frame can be used. Therefore, FIGS. 6 and 7 illustrate examples in which priority information included in the beacon (the beacon frame) is notified of.

[Connection Example to Mesh Network]

Here, one example of a connection method for easily performing connection to the mesh network will be described.

For example, when setting information for performing connection to a specific mesh network is distributed in cooperation with the SNS, it is possible to increase the number of information processing devices that participate in the mesh network.

As a form used in cooperation with the SNS, compressing connection information such as an SSID or a passphrase and distributing it as information shared on the SNS in a form such as a hashtag can be considered.

In addition, a method in which access to a place in which connection information is distributed is guided on the SNS in a form such as a shortened Uniform Resource Locator (URL) can be considered.

In addition, a method in which user authentication is performed in a destination in which the hashtag or the shortened URL is selected, and distribution of information on access to the mesh network is limited can be considered.

That is, the control unit 170 can perform control such that setting information for performing connection to the network to which the information processing device 100 belongs is distributed through the SNS.

[Format Example of Priority Information]

FIG. 6 is a diagram illustrating a format example of a beacon (a beacon frame) that is transmitted from information processing devices of the communication system 10 in the first embodiment of the present technology.

A beacon 400 includes a preamble 410, a header 420, and beacon information 430.

The preamble 410 is information indicating the presence of a packet (a beacon). That is, information processing devices of the communication system 10 can detect the presence of the beacon by receiving the preamble 410.

The header 420 stores information about the packet (beacon) itself arranged in a predetermined position of the packet. For example, information items (information about the packet (beacon) itself) such as a transmission source, a transmission destination, and a size of a packet are stored in the header 420. That is, information processing devices of the communication system 10 decode and analyze the header. According to the analysis, information processing devices of the communication system 10 can detect which information processing devices transmit and receive a signal and a type of the signal (for example, whether it is a beacon).

The beacon information 430 is information that information processing devices of the communication system 10 are informed of. That is, information processing devices of the communication system 10 include information of which other information processing devices are to be informed in a beacon and transmit the beacon.

Next, the beacon information 430 will be described in detail.

The beacon information 430 includes time information 431, a network ID 432, a network attribute 433, subject device priority information 434, other device priority information 1 (435), other device priority information 2 (436), and other information 437.

The time information 431 is time information indicating a time at which the beacon including the information is transmitted from an information processing device serving as a transmission source.

The network ID 432 is information indicating an ID of a network to which the information processing device serving as a transmission source belongs.

The network attribute 433 is information indicating an attribute of the network to which the information processing device serving as a transmission source belongs.

The subject device priority information 434 is priority information about the information processing device (the subject device) serving as a transmission source of the beacon. For example, when the information processing device (the subject device) serving as a transmission source of the beacon is the information processing device 100, the priority 302 corresponding to the number "1000" in the identification information 301 of the priority list 300 illustrated in FIG. 3a is stored in the field of the subject device priority information 434.

In addition, the other device priority information 1 (435) and the other device priority information 2 (436) are priority information about other information processing devices (other devices) other than the information processing device (the subject device) serving as a transmission source of the beacon. For example, when the information processing device (the subject device) serving as a transmission source of the beacon is the information processing device 100, the priority 302 corresponding to the number "1001" in the identification information 301 of the priority list 300 illustrated in FIG. 3a is stored in the field of the other device priority information 1 (435). In addition, the priority 302 corresponding to the number "1002" in the identification information 301 of the priority list 300 illustrated in FIG. 3a is stored in the field of the other device priority information 2 (436).

Here, FIG. 6 illustrates an example in which priority information (the other device priority information 1 (435) and the other device priority information 2 (436)) about two information processing devices other than the subject device is stored in the beacon 400. However, priority information (other device priority information) about one, three or more other information processing devices may be stored in the beacon 400.

In this manner, by transmitting priority information (the subject device priority information 434) about the subject device included in the beacon 400 to an information processing device with which direct communication is possible, the priority of the subject device can be notified of. In addition, an information processing device with which direct communication is not possible can be notified of the priority of the subject device by allowing another information processing device to transmit priority information about the subject device as other device priority information (for example, the other device priority information 1 (435)).

For example, a case in which the information processing device 210 illustrated in FIG. 1 transmits priority information (priority information (the subject device priority information 434) about the information processing device 210) is assumed. In this case, the information processing device 100 that has received the priority information (the subject device priority information 434) retains the priority information in the priority list 300 in association with identification information "1001" of the information processing device 210 that has transmitted the priority information. In addition, the information processing device 100 transmits subject device priority information (the subject device priority information 434) and other device priority information (for example, the other device priority information 1 (435)). In this case, priority information about the information processing device 100 is transmitted as subject device priority information (the subject device priority information 434), and priority information about the information processing device 210 is transmitted as other device priority information (for example, the other device priority information 1 (435)). In this manner, priority information about each information processing device is sequentially transmitted through the multi-hop relay. Accordingly, it is possible to transmit priority information about each of the information processing devices to each of the information processing devices of the network 200.

In addition, in order to efficiently use wireless communication resources, priority information does not have to be included in all beacons, but priority information may be intermittently included in the beacon and the beacon may be transmitted. This example is illustrated in FIG. 7.

In addition, the other information 437 is information other than the above-described information.

[Transmission Example of Priority Information]

FIG. 7 is a diagram illustrating a transmission example when information processing devices of the communication system 10 in the first embodiment of the present technology transmit priority information.

FIG. 7 illustrates an example in which a beacon (a beacon signal) including priority information is periodically transmitted. In addition, FIG. 7 illustrates a transmission example of a beacon when a horizontal axis is set as a time axis. In addition, FIG. 7 schematically illustrates beacons 441 to 445 that are sequentially transmitted in time series.

Here, when priority information included in the beacon is transmitted, there is concern about performance of the network decreasing due to the inclusion of the priority information in all beacons. Therefore, for example, priority information can be intermittently included. For example, as illustrated in FIG. 7, priority information 451 and 452 is included only in the beacons 441 and 444 for each predetermined interval, In this manner, information processing devices of the communication system 10 periodically inform a nearby information processing device of the priority information (included in the beacon).

For example, when the information processing device 100 illustrated in FIG. 1 broadcasts a beacon, the nearby information processing device (for example, the information processing device 210) receives the beacon. Therefore, the information processing device 210 can detect that the beacon is a beacon transmitted from the information processing device 100 based on a header of the received beacon. In addition, when the information processing device 210 confirms content of the beacon information 430 included in the received beacon, it is possible to recognize the inclusion of the priority information in the received beacon.

In addition, when the priority information included in the beacon is transmitted, information about an information processing device having a high priority may be preferentially or selectively transferred. For example, a transmission frequency of priority information of the information processing device having a high priority (for example, priority 3) is set to be greater than a transmission frequency of priority information of an information processing device having a low priority (for example, priority 2). In this manner, when the priority information included in the beacon is transmitted, if information about the information processing device having a high priority is preferentially or selectively transferred, it is possible to efficiently use wireless communication resources.

In addition, when connection to the mesh network is performed, a device discovery protocol that is operated in L3 or higher may be used. In this case, even when information about the device discovery protocol is transferred to another information processing device, information about the information processing device having a high priority in the mesh network can be selectively or preferentially transferred. Accordingly, it is possible to efficiently select a route through the information processing device having a high priority.

[Operation Example of Information Processing Device (Allocation Example of Transmission Power)]

Figure 8:
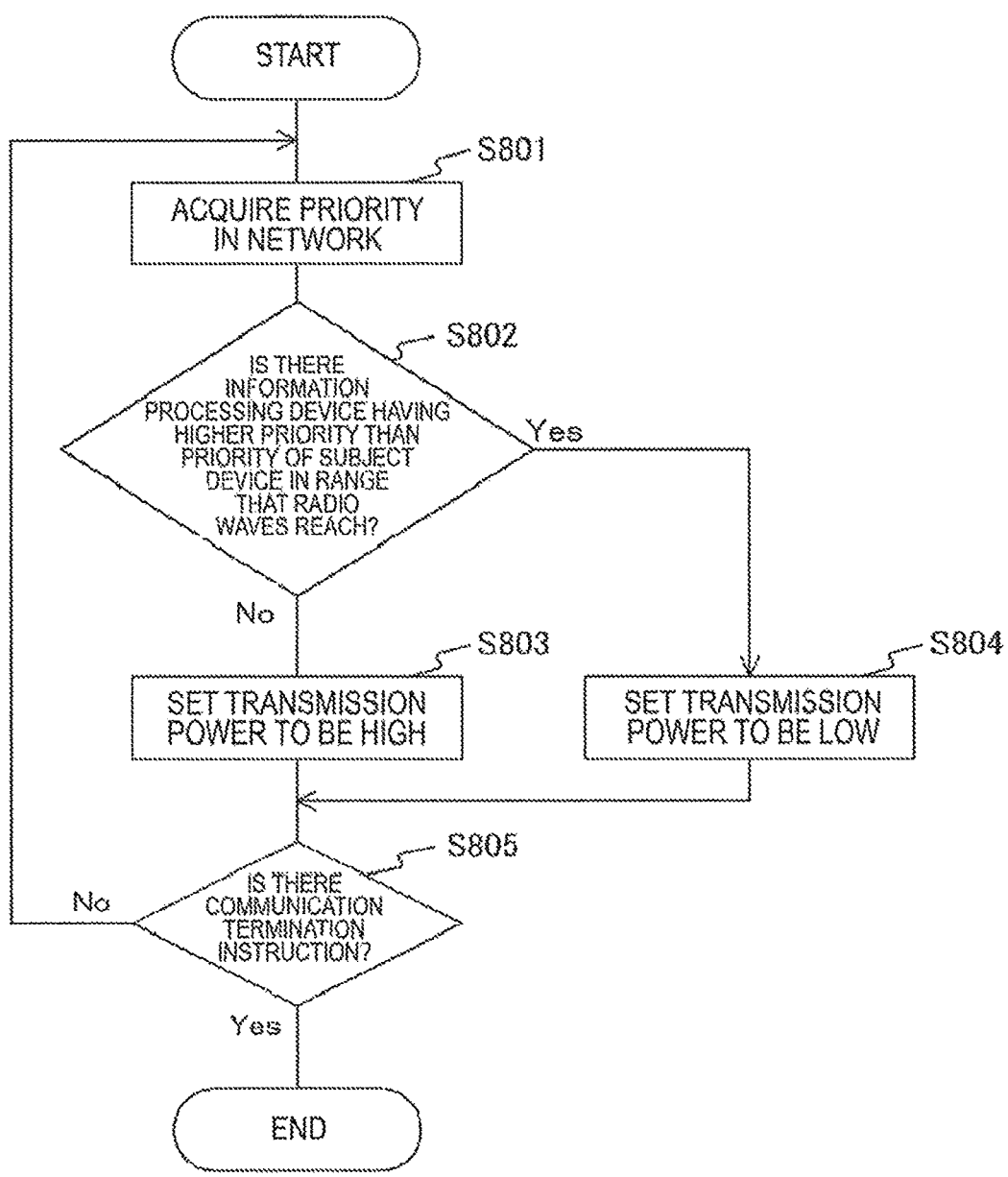
FIG. 8 is a flowchart illustrating exemplary processing procedures of a communication resource allocation process performed by the information processing device 100 in the first embodiment of the present technology.

FIG. 8 is a flowchart illustrating exemplary processing procedures of a communication resource allocation process performed by the information processing device 100 in the first embodiment of the present technology. FIG. 8 illustrates an example in which transmission power is allocated (a width of a range reached by radio waves is allocated) as communication resources.

First, the acquisition unit 150 acquires priorities of information processing devices belonging to the network 200 (Step S801). For example, the acquisition unit 150 acquires the priorities 302 stored in the priority list 300 that is stored in the storage unit 171 (Step S801).

Next, the control unit 170 determines whether there is an information processing device having a higher priority than a priority of the subject device among information processing devices (information processing devices belonging to the same network) in a range that radio waves reach (Step S802).

Here, when there is no information processing device having a higher priority than a priority of the subject device among information processing devices in the range that radio waves reach (Step S802), the subject device has the highest priority among information processing devices in the range that radio waves reach. In this case, the control unit 170 performs control such that transmission power is set to be high in order to preferentially allocate communication resources to the subject device (Step S803). Note that even when there is an information processing device having the same priority as the subject device among information processing devices in the range that radio waves reach, it is possible to perform control in this manner.

In addition, when there is an information processing device having a higher priority than a priority of the subject device among information processing devices in the range that radio waves reach (Step S802), it is necessary to preferentially allocate communication resources to the information processing device having the higher priority than a priority of the subject device. Therefore, the control unit 170 performs control such that transmission power is set to be low (Step S804).

In addition, the control unit 170 determines whether there is a communication termination instruction (Step S805). Then, when there is a communication termination instruction (Step S805), an operation of the communication resource allocation process ends. On the other hand, when there is no communication termination instruction (Step S805), the process returns to Step S801.

[Operation Example of Information Processing Device (Allocation Example of Channel)]

Figure 9:
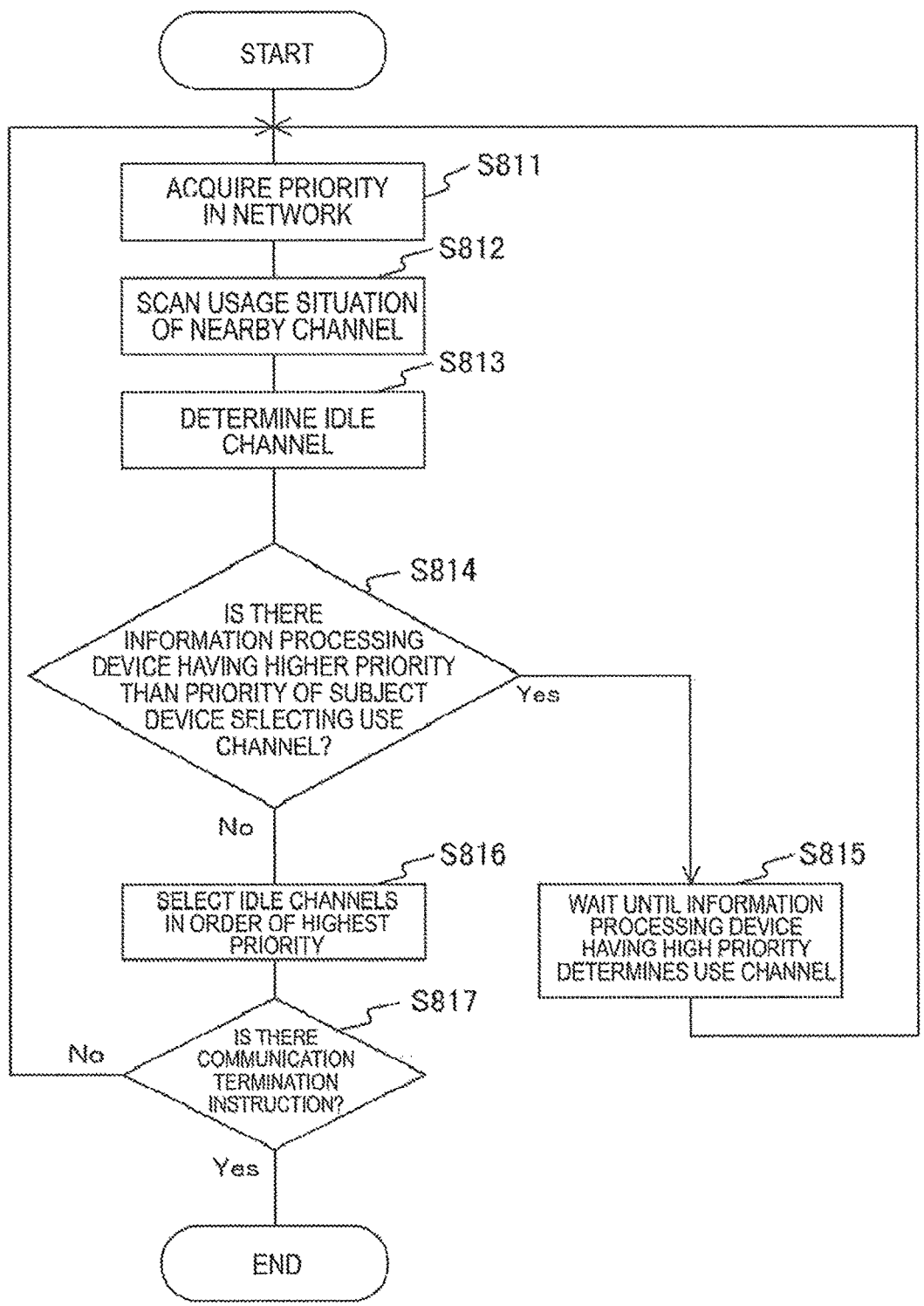
FIG. 9 is a flowchart illustrating exemplary processing procedures of a communication resource allocation process performed by the information processing device 100 in the first embodiment of the present technology.

FIG. 9 is a flowchart illustrating exemplary processing procedures of a communication resource allocation process performed by the information processing device 100 in the first embodiment of the present technology. FIG. 9 illustrates an example in which a channel (a frequency band) is allocated as communication resources.

First, the acquisition unit 150 acquires priorities of information processing devices belonging to the network 200 (Step S811).

Next, the control unit 170 scans a usage situation of a channel near the information processing device 100 (Step S812). Next, the control unit 170 determines an idle channel based on the scan result (Step S813). Note that, in addition to the idle channel, a channel whose congestion level is low may be determined.

Next, the control unit 170 determines whether there is an information processing device that has a higher priority than a priority of the subject device and is selecting a use channel among information processing devices (information processing devices belonging to the same network) in the range that radio waves reach (Step S814).

When there is an information processing device having a higher priority than a priority of the subject device (an information processing device selecting a use channel) (Step S814), the control unit 170 waits until the information processing device having the high priority determines the use channel (Step S815), and the process returns to Step S811.

In addition, when there is no information processing device having a higher priority than a priority of the subject device (Step S814), the control unit 170 performs control such that a use channel is selected among idle channels in order of the highest priority (Step S816).

In addition, the control unit 170 determines whether there is a communication termination instruction (Step S817). Then, when there is a communication termination instruction (Step S817), an operation of the communication resource allocation process ends. On the other hand, when there is no communication termination instruction (Step S817), the process returns to Step S811.

Note that, when channel allocation is performed, channel allocation may be performed in consideration of a congestion level. For example, channel allocation may be performed after determining a priority of a channel according to a congestion level. For example, a priority of a channel whose congestion level is high (for example, a channel whose congestion level is equal to or greater than a threshold th3) can be set to be low, and a priority of a channel whose congestion level is low (for example, a channel whose congestion level is less than a threshold th4 (where, th4<th3)) can be set to be high. Accordingly, for example, when there is no information processing device having a higher priority than a priority of the subject device (Step S814), the control unit 170 can select a use channel among idle channels (channels whose congestion levels are low) in order of the highest priority (Step S816). That is, the control unit 170 can perform control such that a channel whose congestion level is lower than a threshold serving as a reference is allocated to an information processing device whose relative priority is high, and a channel whose congestion level is greater than a threshold serving as a reference is allocated to an information processing device whose relative priority is low. In addition, when channel allocation is performed, channel allocation may be performed by applying an upper limit of the number of information processing devices that can be connected to the same channel.

[Operation Example of Information Processing Device (Allocation Example of Transmission Timing)]

Figure 10:
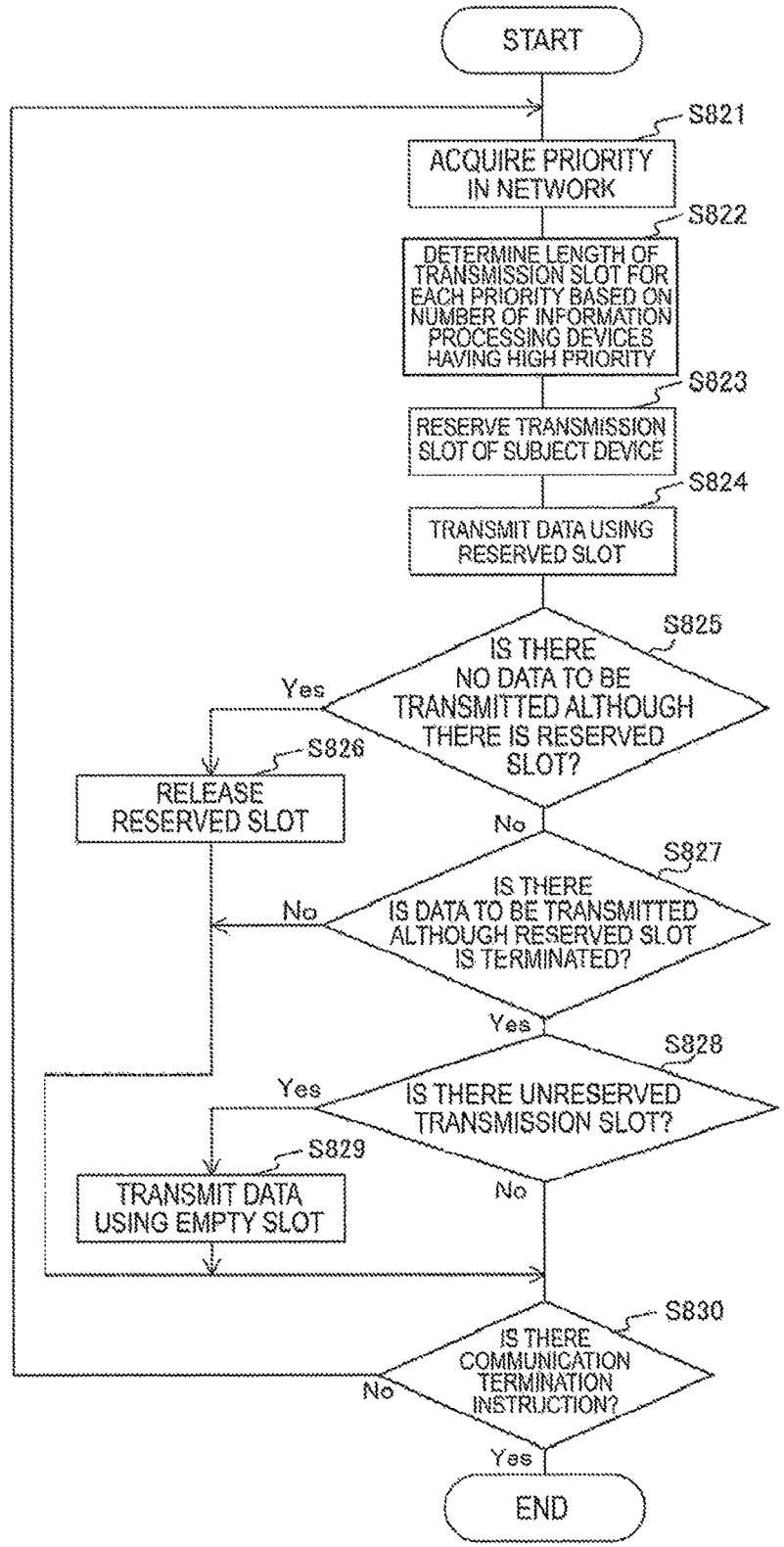
FIG. 10 is a flowchart illustrating exemplary processing procedures of a communication resource allocation process performed by the information processing device 100 in the first embodiment of the present technology.

FIG. 10 is a flowchart illustrating exemplary processing procedures of a communication resource allocation process performed by the information processing device 100 in the first embodiment of the present technology. FIG. 10 illustrates an example in which a transmission timing is allocated as communication resources.

First, the acquisition unit 150 acquires priorities of information processing devices belonging to the network 200 (Step S821).

Next, the control unit 170 specifies the number of information processing devices having a high priority based on the acquired priorities, and determines a length of a transmission slot for each priority based on the number of information processing devices having a high priority (Step S822). Here, the slot refers to a reserved section for data communication in the mesh network. In addition, in this example, a case in which a length of each transmission slot is represented as a usage percent per unit time is assumed. For example, 50% per unit time is determined as a length of a transmission slot having the highest priority (for example, a transmission slot whose priority is 3). In addition, 25% per unit time is determined as a length of a transmission slot having the next highest priority (for example, a transmission slot whose priority is 2). 10% per unit time is determined as a length of a transmission slot having the lowest priority (for example, a transmission slot whose priority is 1).

Next, the control unit 170 reserves a transmission slot of the subject device (the information processing device 100) (Step S823). For example, it is possible to reserve a transmission slot of which a nearby information processing device is notified according to a method defined in specifications.

Next, the control unit 170 transmits data using the reserved transmission slot (the reserved slot) (Step S824).

Next, the control unit 170 determines whether there is no data to be transmitted although there is a reserved slot (Step S825). When there is a reserved slot but there is no data to be transmitted (Step S825), the control unit 170 opens the reserved slot (Step S826), and the process advances to Step S830.

In addition, when there is no reserved slot, or when there are a reserved slot and data to be transmitted (Step S825), the control unit 170 determines whether there is data to be transmitted although the reserved slot is terminated (Step S827). Note that a case in which the reserved slot is terminated refers to a case in which there is no reserved slot.

When the reserved slot is terminated and there is no data to be transmitted (Step S827), the process advance to Step S830. In addition, when there is a reserved slot and there is data to be transmitted (Step S827), after data is transmitted using the reserved slot, it is determined again whether there is data to be transmitted although the reserved slot is terminated (Step S827).

When there is data to be transmitted although the reserved slot is terminated (Step S827), the control unit 170 determines whether there is an unreserved transmission slot (Step S828). Then, when there is an unreserved transmission slot (Step S828), the control unit 170 transmits data using the empty slot (the unreserved transmission slot) (Step S829).

In addition, the control unit 170 determines whether there is a communication termination instruction (Step S830). Then, when there is a communication termination instruction (Step S830), an operation of the communication resource allocation process ends. On the other hand, when there is no communication termination instruction (Step S830), the process returns to Step S821.

In this manner, it is possible to preferentially reserve the transmission timing based on a priority of the information processing device. In addition, it is possible to set a reservation width of the transmission timing to be great based on a priority of the information processing device. In addition, it is possible to reserve the transmission timing in further detail based on the priority of the information processing device.

Note that Steps S801, S811, and S821 are exemplary acquiring procedures described in the claims. In addition, Steps S802 to S804, S814 to S816, and S822 to S826 are exemplary controlling procedures described in the claims.

Here, for example, in the mesh network, it is necessary for information processing devices of the mesh network to relay communication with other information processing devices or a public network in order to exhibit sufficient performance. However, since there is high resistance when other information processing devices use communication resources or power resources of the subject device, it is difficult to expect all users to voluntarily provide a relay function.

In such a circumstance, there is concern about performance of the entire mesh network decreasing. In addition, there is concern about congestion occurring when a communication route is concentrated on a specific information processing device that allows a relay. In addition, there is concern about a significant reconfiguration of a route when the specific information processing device is disconnected from the mesh network for any reason, or fault tolerance that is an advantage of the mesh network decreasing.

Therefore, in the embodiment of the present technology, communication resources of the network are appropriately allocated based on priorities of information processing devices. Accordingly, it is possible to efficiently use communication resources of the network, and increase performance of communication of the network.

For example, by assigning an incentive of the priority, information processing devices can fully serve as relay devices, and performance of the entire mesh network can increase.

In addition, for example, by preferentially allocating communication resources in consideration of characteristics of the information processing devices, it is possible to increase performance of an application system on the mesh network.

In addition, for example, by enabling simple participation in the mesh network, it is possible to increase performance of the entire mesh network.

In addition, for example, by assigning an incentive when participation in the mesh network is performed, it is possible to encourage participation in the mesh network and increase performance of the mesh network.

In addition, for example, when priority information included in the beacon is transmitted, if information about the information processing device having a high priority is preferentially or selectively transferred, it is possible to efficiently use wireless communication resources.

In addition, even when a priority of the information processing device is not high, if points possessed by a user of the information processing device are used, it is possible to obtain the same degree of allocation as allocation that can be obtained when a priority is high.

Note that, in the embodiment of the present technology, an example in which one information processing device is managed in association with one priority is described. However, one information processing device may be managed in association with a plurality of priorities. For example, a first priority for transmitting data to another information processing device belonging to the network and a second priority for receiving data from another information processing device belonging to the network may be separately retained in the priority list 300. In this case, the control unit 170 performs control such that, when data is transmitted using communication resources of the network, communication resources are allocated based on the first priority. On the other hand, the control unit 170 performs control such that, when data is received using communication resources of the network, communication resources are allocated based on the second priority.

<2. Application Example>

The technology according to the disclosure can be applied to various products. For example, the information processing devices 100, 210, 220, 230, and 240 may be realized as mobile terminals such as smartphones, tablet PCs (Personal Computers), notebook PCs, portable game terminals, or digital cameras, fixed-type terminals such as television receivers, printers, digital scanners, or network storages, or car-mounted terminals such as car navigation devices. In addition, the information processing devices 100, 210, 220, 230, and 240 may be realized as terminals that perform M2M (Machine to Machine) communication (also referred to as MTC (Machine Type Communication) terminals) such as smart meters, vending machines, remotely controlled surveillance devices, or POS (Point Of Sale) terminals. Furthermore, the information processing devices 100, 210, 220, 230, and 240 may be wireless communication modules mounted in such terminals (for example, integrated circuit modules configured by one die).

[2-1. First Application Example]

Figure 11:
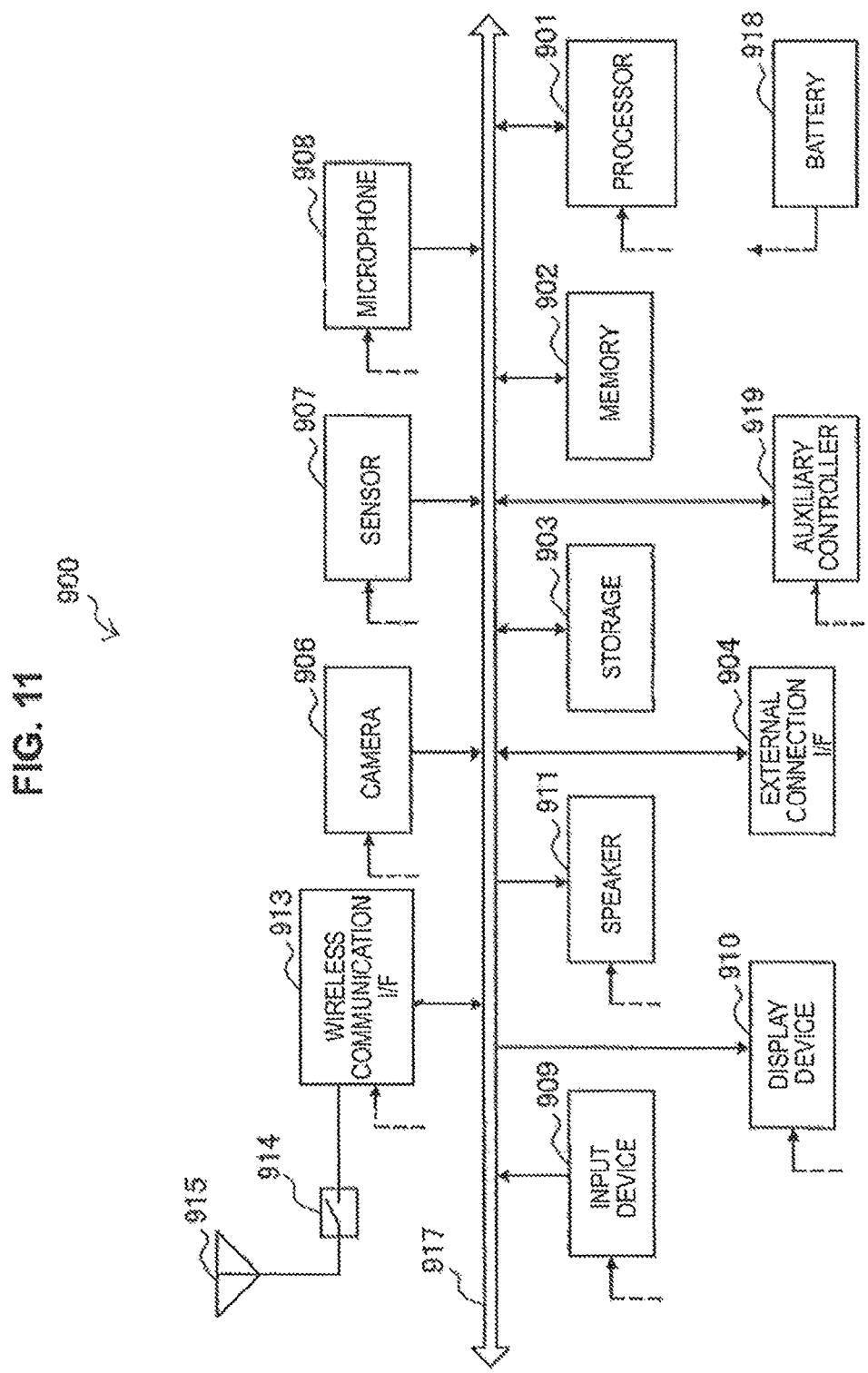
FIG. 11 is a block diagram showing an example of a schematic configuration of a smartphone.

FIG. 11 is a block diagram showing an example of a schematic configuration of a smartphone 900 to which an embodiment of the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip), and controls functions of an application layer and other layers of the smartphone 900. The memory 902 includes a RAM (Random Access Memory) and a ROM (Read Only Memory), and stores programs executed by the processor 901 and data. The storage 903 can include a storage medium such as a semiconductor memory or a hard disk. The externally connected interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive manipulations or information inputs from a user. The display device 910 has a screen such as a liquid crystal display (LCD), or an organic light emitting diode (OLEO) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to execute the wireless LAN communication. The wireless communication interface 913 can communicate with another device via a wireless LAN access point in an infrastructure mode. In addition, the wireless communication interface 913 can directly communicate with another device in an ad hoc mode. The wireless communication interface 913 can typically include a baseband processor, an RF (Radio Frequency) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 11. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 11 via power supply lines partially indicated by dashed lines in the drawing. The auxiliary controller 919 causes, for example, minimum necessary functions of the smartphone 900 to be operated in a sleep mode.

Also, in the smartphone 900 illustrated in FIG. 11, the acquisition unit 150 and the control unit 170, which are described by using FIG. 2, may be implemented in the wireless communication interface 913. Also, at least a part of these functions may be implemented in the processor 901 or the auxiliary controller 919.

Note that, when the processor 901 executes an access point function at an application level, the smartphone 900 may be operated as a wireless access point (a software AP). In addition, the wireless communication interface 913 may include a wireless access point function.

[2-2. Second Application Example]

Figure 12:
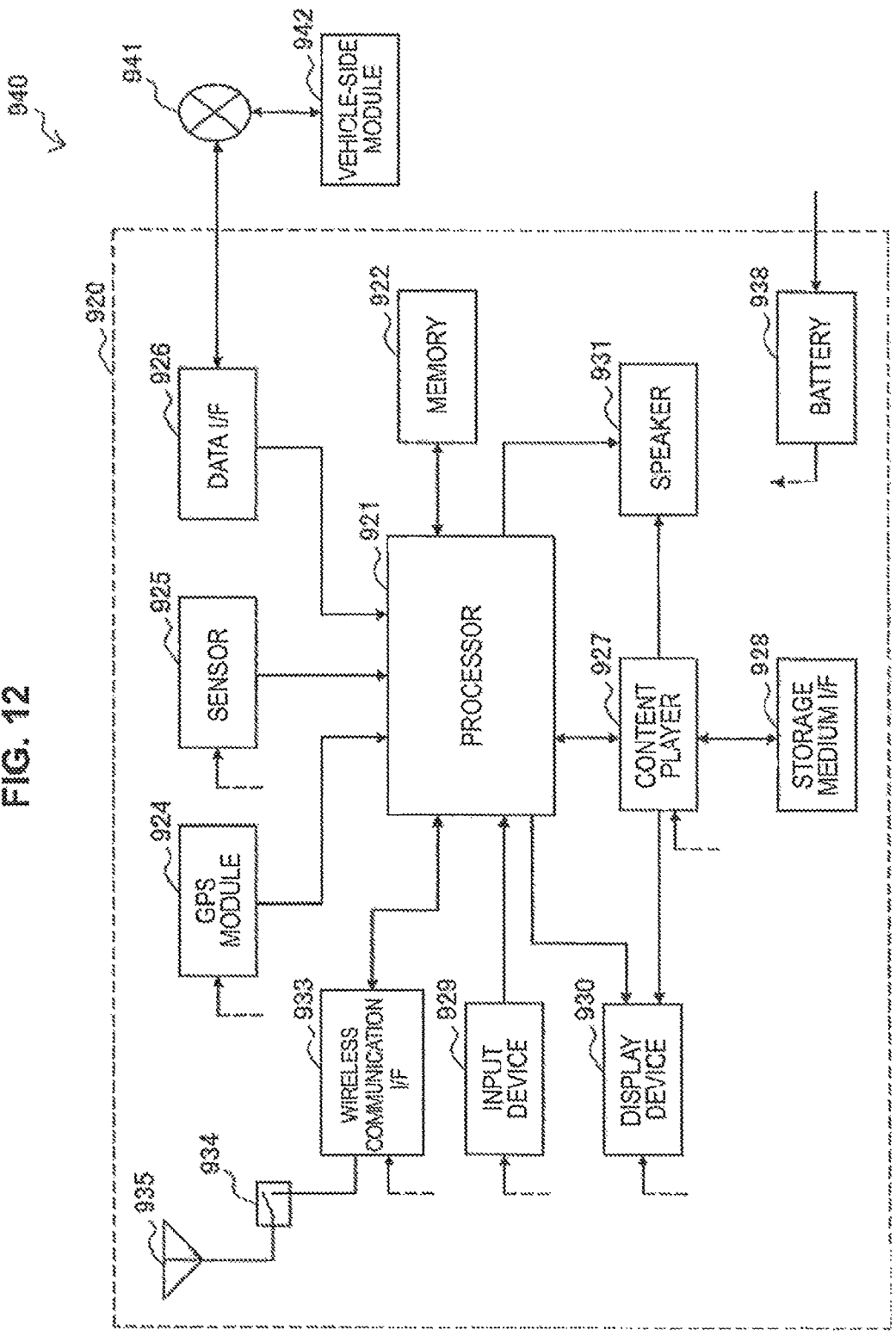
FIG. 12 is a block diagram showing an example of a schematic configuration of a car navigation device.

FIG. 12 is a block diagram showing an example of a schematic configuration of a car navigation device 920 to which an embodiment of the technology of the present disclosure can be applied. The car navigation device 920 includes a processor 921, a memory 922, a UPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes a RAM and a ROM storing programs executed by the processor 921 and data.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to a car-mounted network 941 via, for example, a terminal that is not shown to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLEO display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad, to execute wireless LAN communication. The wireless communication interface 933 can communicate with another device via a wireless LAN access point in the infrastructure mode. In addition, the wireless communication interface 933 can directly communicate with another device in an ad hoc mode. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation device 920 may include a plurality of antennas, without being limited to the example of FIG. 12. In this case, the antenna switch 934 may be omitted from the configuration of the car navigation device 920.

The battery 938 supplies electric power to each of the blocks of the car navigation device 920 shown in FIG. 12 via power supply lines partially indicated by dashed lines in the drawing. In addition, the battery 938 accumulates electric power supplied from the vehicle.

In the car navigation device 920 illustrated in FIG. 12, the acquisition unit 150 and the control unit 170, which are described by using FIG. 2, may be implemented in the wireless communication interface 933. Also, at least a part of these functions may be implemented in the processor 921.

An embodiment of the technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

The above-described embodiments are examples for embodying the present technology, and matters in the embodiments each have a corresponding relationship with subject matter in the claims. Likewise, the matters in the embodiments and the subject matter in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a sequence of sequences or may be handled as a program for causing a computer to execute the sequence of sequences and recording medium storing the program. As the recording medium, a CD (Compact Disc), an MD (MiniDisc), and a DVD (Digital Versatile Disk), a memory card, and a Blu-ray disc (registered trademark) can be used.

In addition, the effects described in the present specification are not limiting but are merely examples, and there may be additional effects.

Additionally, the present technology may also be configured as below.

(1) An information processing device including:
an acquisition unit configured to acquire a relative priority of each information processing device in a network built through autonomous wireless communication of a plurality of information processing devices; and
a control unit configured to perform control such that a communication resource of the network is allocated based on the priority.

(2) The information processing device according to (1), wherein the control unit performs control such that the communication resource is allocated based on a comparison result of the priority of another information processing device belonging to the network and a priority of the information processing device.

(3) The information processing device according to (1) or (2),
wherein the control unit performs control such that a magnitude of transmission power is allocated as the communication resource.

(4) The information processing device according to (1) or (2),
wherein the control unit performs control such that a channel is allocated as the communication resource.

(5) The information processing device according to (4),
wherein the control unit performs control such that a channel whose congestion level is lower than a threshold serving as a reference is allocated to an information processing device whose relative priority is high, and a channel whose congestion level is greater than a threshold serving as a reference is allocated to an information processing device whose relative priority is low.

(6) The information processing device according to (1) or (2), wherein the control unit performs control such that a transmission timing is allocated as the communication resource.

(7) The information processing device according to any of (1) to (6), wherein the acquisition unit acquires the relative priority from list information in which a priority of an information processing device belonging to the network is retained for each information processing device.

(8) The information processing device according to (7), wherein the list information separately retains a first priority for transmitting data to another information processing device belonging to the network and a second priority for receiving data from another information processing device belonging to the network, and wherein the control unit performs control such that, when data is transmitted using the communication resource, the communication resource is allocated based on the first priority, and when data is received using the communication resource, the communication resource is allocated based on the second priority.

(9) The information processing device according to any of (1) to (9), wherein the control unit performs control such that a priority of the information processing device is changed based on point information about the information processing device.

(10) The information processing device according to (9), wherein the control unit performs control such that the priority of the information processing device is set to be high using the point information.

(11) The information processing device according to (9) or (10), wherein the control unit performs control such that the point information is exchanged with another information processing device belonging to a network other than the network.

(12) The information processing device according to any of (9), to (11)

wherein the control unit performs control such that the point information is added based on a user activity in a social networking service (SNS).

(13) The information processing device according to any of (1) to (12), wherein the control unit performs control such that setting information for performing connection to the network is distributed through an SNS.

(14) The information processing device according to any of (1) to (13), wherein the control unit performs control such that priority information for notifying another information processing device of a priority of the information processing device is included in a beacon and transmitted.

(15) An information processing method including:

an acquiring procedure of acquiring a relative priority of each information processing device in a network built through autonomous wireless communication of a plurality of information processing devices; and a controlling procedure of allocating a communication resource of the network based on the priority.

(16) A program causing a computer to execute:

an acquiring procedure of acquiring a relative priority of each information processing device in a network built through autonomous wireless communication of a plurality of information processing devices; and a controlling procedure of allocating a communication resource of the network based on the priority.

REFERENCE SIGNS LIST

10 communication system
100, 210, 220, 230, 240 information processing device
110 posture detection unit
120 image capturing unit
130 sound acquisition unit
140 wireless communication unit
150 acquisition unit
160 operation accepting unit
170 control unit
171 storage unit
180 display unit
190 voice output unit
200 network
900 smartphone
901 processor
902 memory
903 storage
904 externally connected interface
906 camera
907 sensor
908 microphone
909 input device
910 display device
911 speaker
913 wireless communication interface
914 antenna switch
915 antenna
917 bus
918 battery
919 auxiliary controller
920 car navigation device
921 processor
922 memory
924 GPS module
925 sensor
926 data interface
927 content reproducer
928 storage medium interface
929 input device
930 display device
931 speaker
933 wireless communication interface
934 antenna switch
935 antenna
938 battery
941 car-mounted network
942 vehicle-side module

The invention claimed is:

1. An information processing node, comprising:
circuitry configured to
acquire priority information indicating respective priorities of a plurality of information processing devices in a wireless communication network,
determine a priority of the information processing node based on the acquired priority information and each value of point information assigned to each of the plurality of information processing devices by a user operation, perform wireless communication using a communication resource of the wireless communication network that is allocated based on the determined priority, and exchange data packets between the information processing node and the plurality of information processing devices in the wireless communication network using a multi-hop relay.

2. The information processing node according to claim 1, wherein the circuitry is further configured to
obtain the communication resource based on a comparison result of one or more of the priorities of the plurality of information processing devices and the priority of the information processing node.

3. The information processing node according to claim 1, wherein
the communication resource corresponds to a magnitude of transmission power.

4. The information processing node according to claim 1, wherein
the communication resource corresponds to allocation of a channel.

5. The information processing node according to claim 4, wherein
a channel whose congestion level is lower than a first threshold is allocated to an information processing device whose priority level is above a second threshold, and
a channel whose congestion level is greater than a third threshold is allocated to an information processing device whose priority level is below a fourth threshold.

6. The information processing node according to claim 1, wherein
the communication resource corresponds to allocation of a transmission timing.

7. The information processing node according to claim 1, wherein the circuitry is configured to
retain the priorities of the plurality of information processing devices as list information, and
acquire a relative priority of the information processing node based on the list information.

8. The information processing node according to claim 7, wherein
the list information separately retains first priorities for transmitting data and second priorities for receiving data,
the circuitry is configured to perform data transmission using the communication resource that is allocated based on the first priorities, and
the circuitry is configured to perform data reception using the communication resource that is allocated based on the second priorities.

9. The information processing node according to claim 1, wherein the circuitry is configured to
exchange the point information with another device that is outside the wireless communication network.

10. The information processing node according to claim 9, wherein the circuitry is further configured to
calculate the value of the point information of the information processing node associated with a user of the information processing node based on a user activity of the user in a social networking service (SNS).

11. The information processing node according to claim 9, wherein the circuitry is further configured to
calculate the value of the point information of the information processing node based on physical device attributes information of the information processing node.

12. The information processing node according to claim 9, wherein the circuitry is further configured to
calculate the value of the point information of the information processing node based on user account information of a user of the information processing node.

13. The information processing node according to claim 1, wherein the circuitry is further configured to
distribute setting information for performing the wireless communication through a social networking service (SNS).

14. The information processing node according to claim 1, wherein the circuitry is configured to
include the priority information in a beacon, and
transmit the beacon in the wireless communication network,
wherein the plurality of information processing devices are configured to update the priority information with their own priority information using the multi-hop relay.

15. An information processing method, comprising:
acquiring, by circuitry of an information processing node, priority information indicating respective priorities of a plurality of information processing devices in a wireless communication network;
determining a priority of the information processing node based on the acquired priority information and each value of point information assigned to each of the plurality of information processing devices by a user operation;
performing wireless communication using a communication resource of the wireless communication network that is allocated based on the determined priority; and
exchanging data packets between the information processing node and the plurality of information processing devices in the wireless communication network using a multi-hop relay.

16. The information processing method according to claim 15, further comprising:
obtaining the communication resource based on a comparison result of one or more of the priorities of the plurality of information processing devices and the priority of the information processing node.

17. A non-transitory computer-readable medium having computer-readable instructions which when executed by a processor of an information processing node cause the information processing node to:
acquire priority information indicating respective priorities of a plurality of information processing devices in a wireless communication network,
determine a priority of the information processing node based on the acquired priority information and each value of point information assigned to each of the plurality of information processing devices by a user operation,
perform wireless communication using a communication resource of the wireless communication network that is allocated based on the determined priority, and
exchange data packets between the information processing node and the plurality of information processing devices in the wireless communication network using a multi-hop relay.

18. The non-transitory computer-readable medium according to claim 17, wherein the computer-readable instructions which when executed by the processor of the information processing node further cause the information processing node to obtain the communication resource based on a comparison result of one or more of the priorities of the plurality of information processing devices and the priority of the information processing node.

* * * * *